E. F. STEPHENS & W. J. COX.
Improvement in Mechanical Toys.

No. 131,128. Patented Sep. 3, 1872.

Witnesses:

Edward F. Stephens
William J. Cox

UNITED STATES PATENT OFFICE.

EDWARD F. STEPHENS AND WILLIAM J. COX, OF JERSEY CITY, NEW JERSEY.

IMPROVEMENT IN MECHANICAL TOYS.

Specification forming part of Letters Patent No. 131,128, dated September 3, 1872.

Specification describing a Mechanical Toy, invented by EDWARD F. STEPHENS and WILLIAM J. COX, both of Jersey City, in the county of Hudson and State of New Jersey.

The invention consists in a walking figure attached to the swiveling front axle or caster of a carriage, and supported from it so as to turn therewith, in combination with cranks carried by said axle, and rods connecting them with the legs of the figure, whereby a walking motion is imparted to it.

Figure 1:
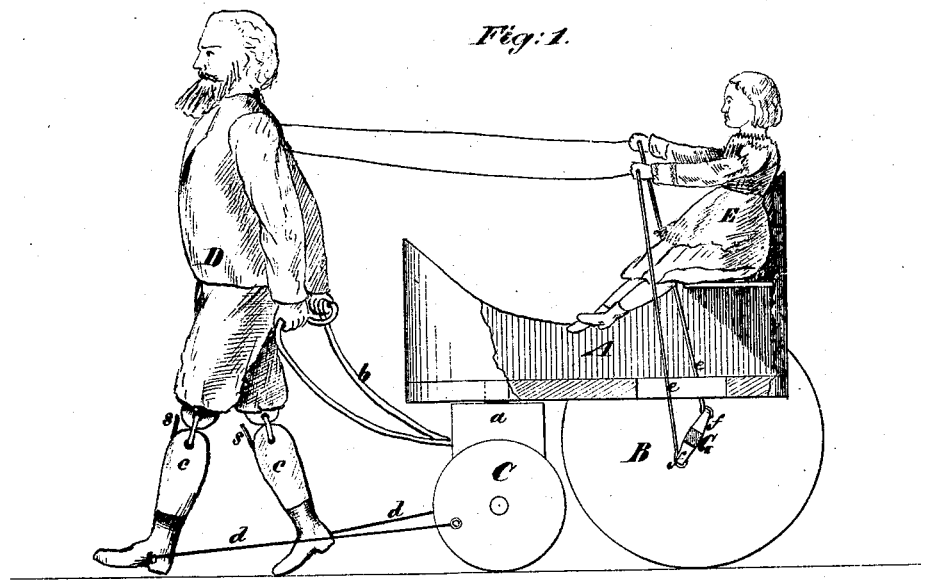
Figure 2:
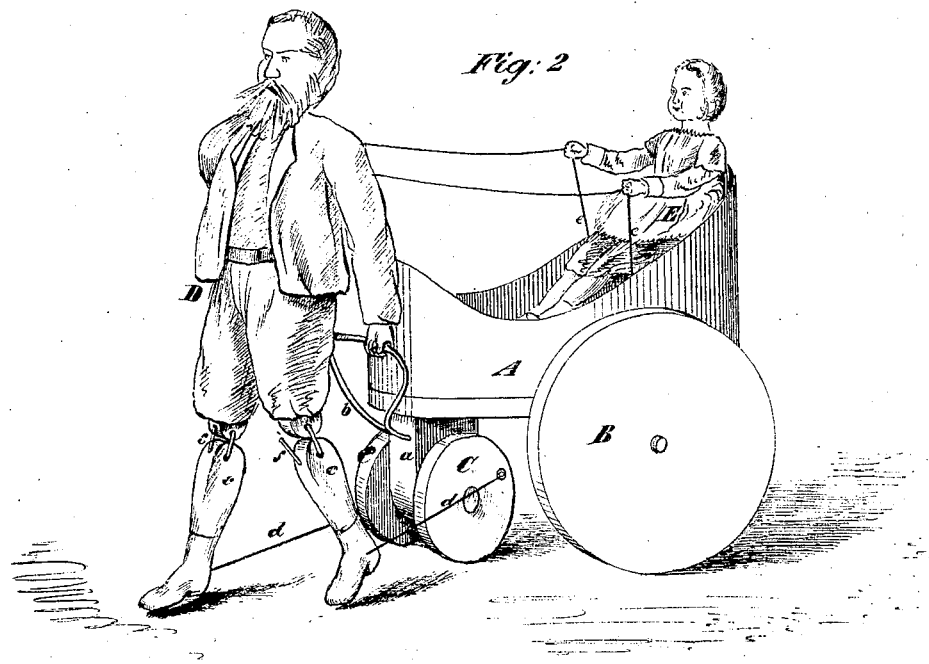

In the accompanying drawing, Figure 1 is a perspective view of the toy, in the position assumed by it in going straight forward, and Fig. 2 is a similar view representing it as turning.

Similar letters of reference indicate corresponding parts in both figures.

A is the carriage, whose main pair of wheels B B are rigidly secured to it, and whose forward pair, C C, are swiveled thereto. D is the walking figure. It is supported from the swiveled bearing-piece $a$ of the front pair of wheels by having its hands firmly attached to a tongue, $b$, extending from said bearing. The legs $c\ c$ of the figure are pivoted loosely to the body, and are articulated at the knee, the feet being connected by rods $d\ d$, with wrists or pins on the outer sides of the forward wheels C C. By the rotation of the forward wheels the feet of the figure are thrown forward, and when the lower limb comes in line with the thigh or upper joint a stop, $s$, provided on the former, comes in contact with the latter, and prevents the lower joint from swinging further without the upper. At the retraction of the wrists, consequent upon the further rotation of the wheels, the legs are drawn back, and thereby a walking movement of the figure is produced, and, it being supported from the forward axle, turns sidewise with it, when the toy travels in a curve. E is the riding figure, which is so arranged in the carriage A that its hands are nearly over the axle G of the main pair of wheels. Its arms are extended, and are pivoted to the body, and the hands are connected by rods $e\ e$ with cranks $f\ f$ on the axle G, whereby they and the arms are alternately raised and lowered, and an imitation of driving thereby produced.

Claim.

The walking figure attached to the swiveling front axle or caster of the carriage so as to turn therewith, in combination with the cranks carried by said axle and the rods connecting said cranks with the legs of the said figure, substantially as herein described.

EDWARD F. STEPHENS,
WILLIAM J. COX.

Witnesses:
FRED. HAYNES,
FERD. TUSCH.